(12) United States Patent
Gilbertson

(10) Patent No.: US 11,098,828 B2
(45) Date of Patent: Aug. 24, 2021

(54) APPARATUS AND METHODS FOR CONNECTING A FIRST ELECTRICALLY CONDUCTIVE TUBE AND A SECOND ELECTRICALLY CONDUCTIVE TUBE

(71) Applicant: The Boeing Company, Chicago, IL (US)

(72) Inventor: Michael L. Gilbertson, Arlington, WA (US)

(73) Assignee: The Boeing Company, Chicago, IL (US)

( * ) Notice: Subject to any disclaimer, the term of this patent is extended or adjusted under 35 U.S.C. 154(b) by 238 days.

(21) Appl. No.: 16/212,926

(22) Filed: Dec. 7, 2018

(65) Prior Publication Data

US 2020/0182384 A1 Jun. 11, 2020

(51) Int. Cl.
*F16L 25/02* (2006.01)

(52) U.S. Cl.
CPC .......... *F16L 25/025* (2013.01); *F16L 25/021* (2013.01); *F16L 25/023* (2013.01)

(58) Field of Classification Search
CPC . F16L 25/023; F16L 19/0212; F16L 19/0243; F16L 19/041; F16L 19/05
USPC .................. 285/52, 354, 386, 388, 387, 92
See application file for complete search history.

(56) References Cited

U.S. PATENT DOCUMENTS

| 2,257,385 A | * | 9/1941 | Keegan | F24H 9/124 |
| | | | | 122/13.01 |
| 2,278,479 A | * | 4/1942 | Parker | F16L 25/023 |
| | | | | 285/54 |
| 2,578,933 A | * | 12/1951 | Hunter | F16L 27/1008 |
| | | | | 285/8 |
| 2,752,579 A | * | 6/1956 | Caldwell | F16L 25/023 |
| | | | | 439/191 |
| 2,757,943 A | * | 8/1956 | Henderson | F16L 25/023 |
| | | | | 285/52 |
| 2,794,658 A | * | 6/1957 | Purkhiserroyc | F16L 25/023 |
| | | | | 285/52 |
| 2,837,351 A | * | 6/1958 | Bailey | F16L 25/023 |
| | | | | 285/52 |
| 2,850,299 A | * | 9/1958 | Risley | F16L 25/023 |
| | | | | 285/48 |

(Continued)

FOREIGN PATENT DOCUMENTS

EP 0 285 387 10/1988

OTHER PUBLICATIONS

European Patent Office, Extended European Search Report, App. No. 19210686.2 (dated Apr. 14, 2020).

*Primary Examiner* — David Bochna
(74) *Attorney, Agent, or Firm* — Walters & Wasylyna LLC

(57) ABSTRACT

An apparatus includes first and second electrically conductive tubes, first and second electrical isolators, and a nut. The first electrical isolator has a central passageway. The first electrically conductive tube has a flared end disposed around the first electrical isolator. The flared end includes external threads. The second electrically conductive tube has an outer flange. The second electrical isolator is disposed around the second electrically conductive tube and engages the outer flange. The nut is disposed around the second electrically conductive tube and engages the second electrical isolator. The nut includes internal threads corresponding to the external threads of the flared end of the first electrically conductive tube.

20 Claims, 12 Drawing Sheets

(56) References Cited

U.S. PATENT DOCUMENTS

| | | | | |
|---|---|---|---|---|
| 2,867,463 A * | 1/1959 | Snider | F16L 25/023 | 277/612 |
| 2,950,928 A * | 8/1960 | Bowan | F16L 25/023 | 285/52 |
| 3,018,119 A * | 1/1962 | Champion | F16L 25/023 | 285/50 |
| 3,185,501 A * | 5/1965 | Bowan | F16L 25/023 | 285/52 |
| 3,517,950 A * | 6/1970 | Anderson | F16L 25/023 | 285/52 |
| 4,422,674 A * | 12/1983 | Steuernagle | F16L 19/005 | 285/30 |
| 4,469,356 A * | 9/1984 | Duret | F16L 19/028 | 285/384 |
| 4,595,218 A * | 6/1986 | Carr | F16L 25/02 | 285/47 |
| 4,691,944 A * | 9/1987 | Viall, Jr. | F16L 19/0231 | 285/321 |
| 5,447,340 A * | 9/1995 | Sands | F16L 25/023 | 285/328 |
| 5,735,553 A * | 4/1998 | Niemiec | F16L 19/0212 | 285/101 |
| 6,899,358 B2 * | 5/2005 | Richardson | F16L 19/0212 | 285/354 |
| 8,434,964 B2 | 5/2013 | Graham et al. | | |
| 8,840,740 B2 | 9/2014 | Rorabaugh et al. | | |
| 8,939,469 B2 | 1/2015 | Cohen et al. | | |
| 8,956,556 B2 | 2/2015 | Braey et al. | | |
| 8,987,612 B2 | 3/2015 | Callahan et al. | | |
| 9,233,758 B2 | 1/2016 | Hansom et al. | | |
| 9,688,419 B2 | 6/2017 | Irwin et al. | | |
| 9,746,117 B2 | 8/2017 | Hansom et al. | | |
| 9,821,356 B2 | 11/2017 | Cohen et al. | | |
| 10,030,798 B2 | 7/2018 | Waugh | | |
| 2006/0099843 A1* | 5/2006 | Fullner | F16L 5/12 | 439/275 |
| 2015/0091293 A1 | 4/2015 | Rorabaugh et al. | | |
| 2016/0018129 A1* | 1/2016 | Koyama | B64D 11/02 | 210/143 |

* cited by examiner

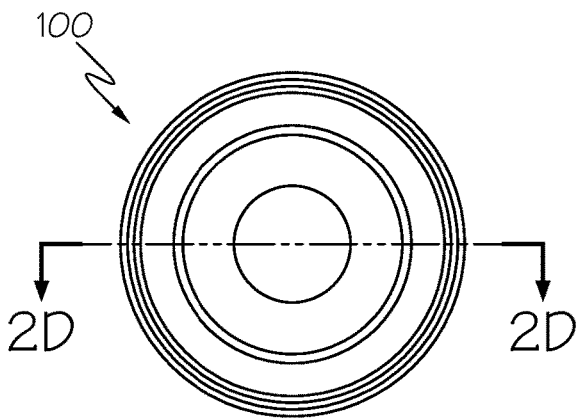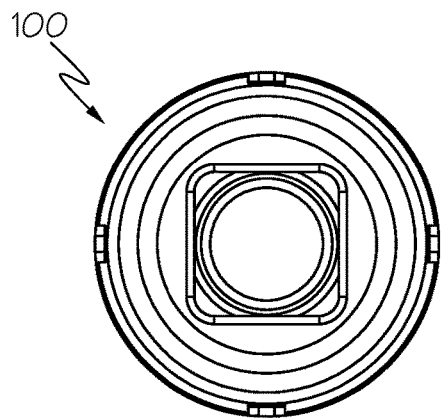
FIG. 2A              FIG. 2B
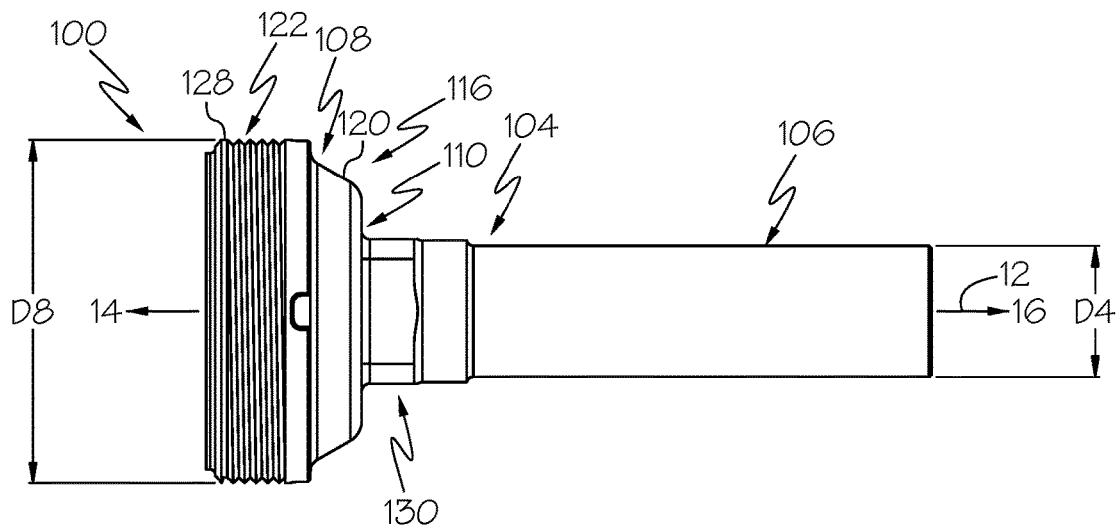
FIG. 2C
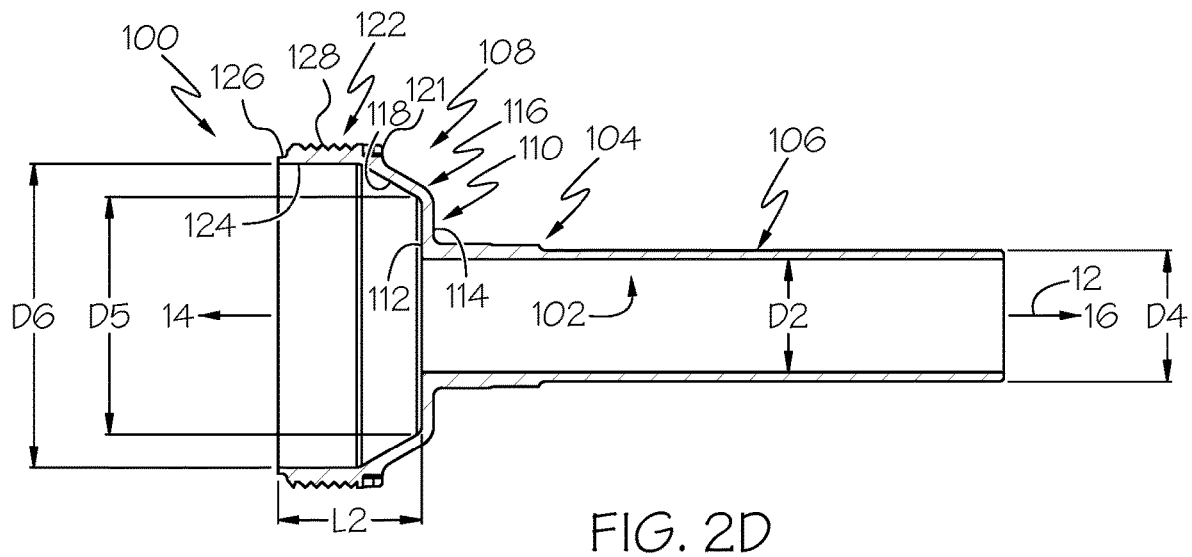
FIG. 2D

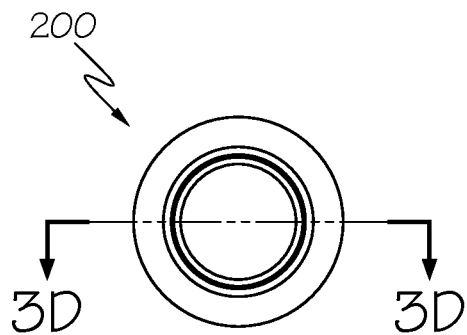
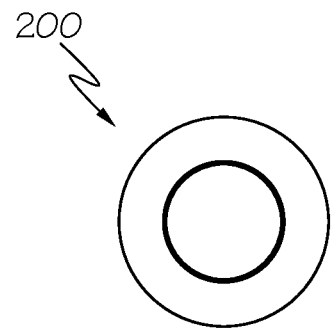
FIG. 3A   FIG. 3B
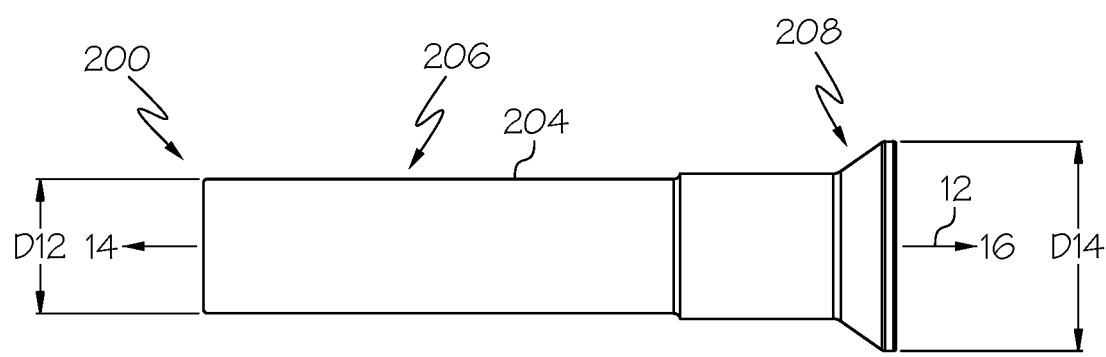
FIG. 3C
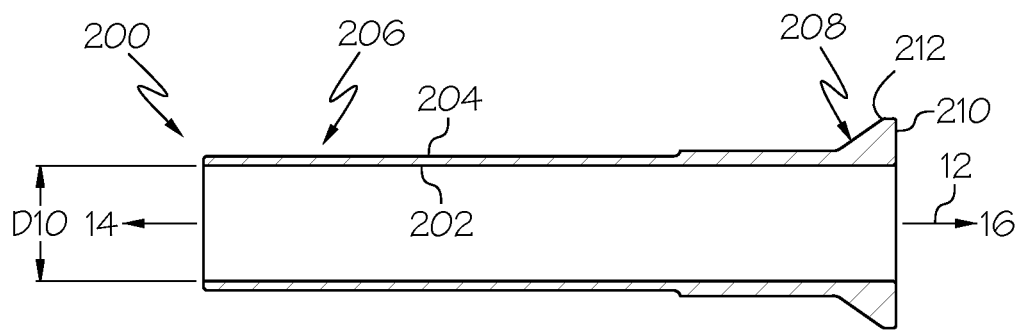
FIG. 3D

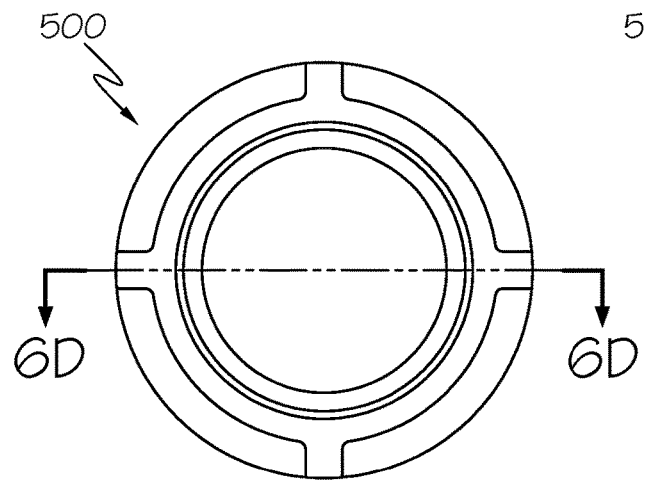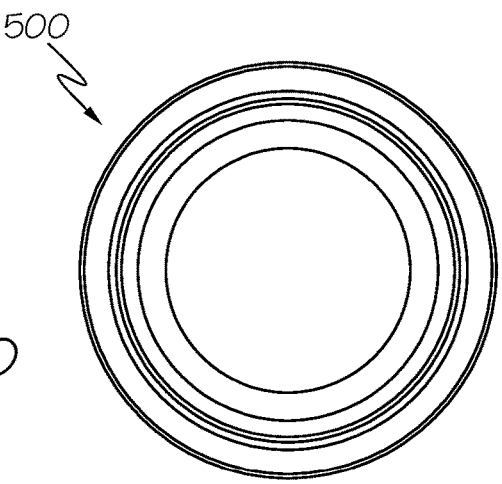
FIG. 6A
FIG. 6B
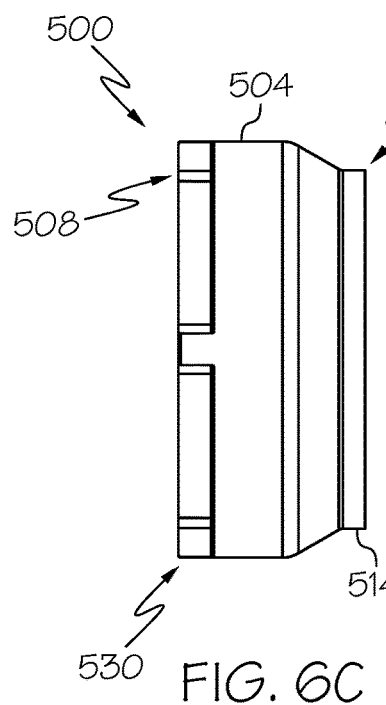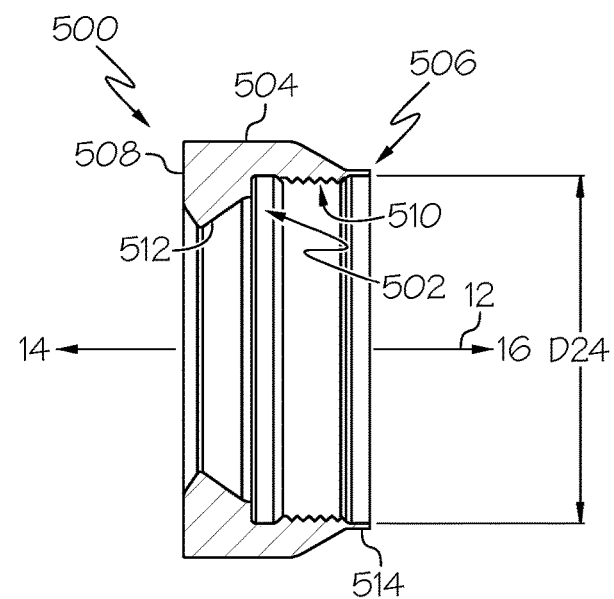
FIG. 6C
FIG. 6D

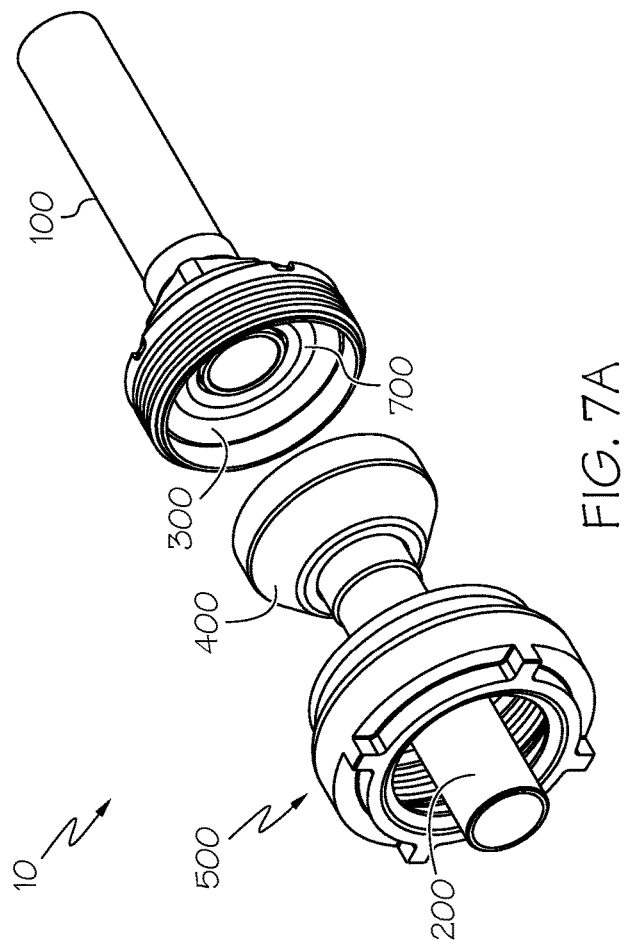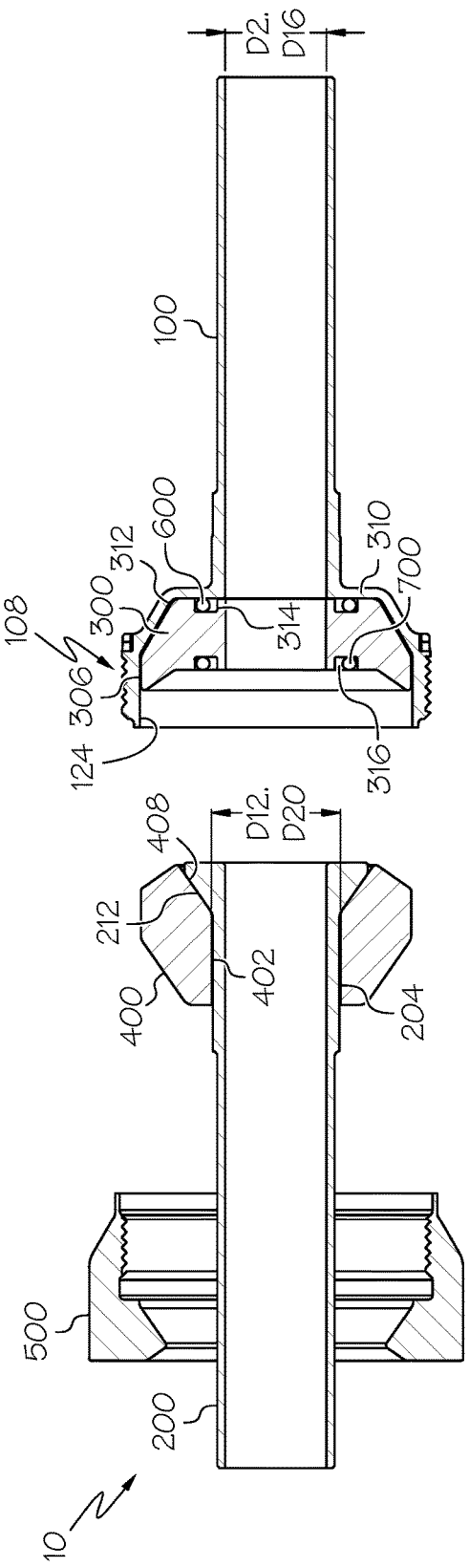

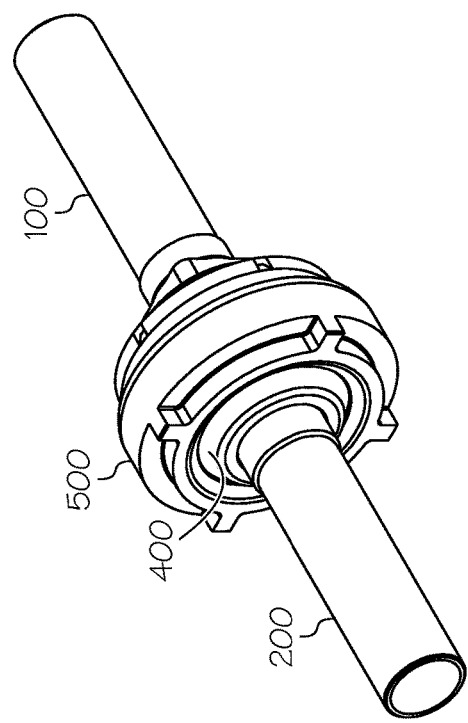
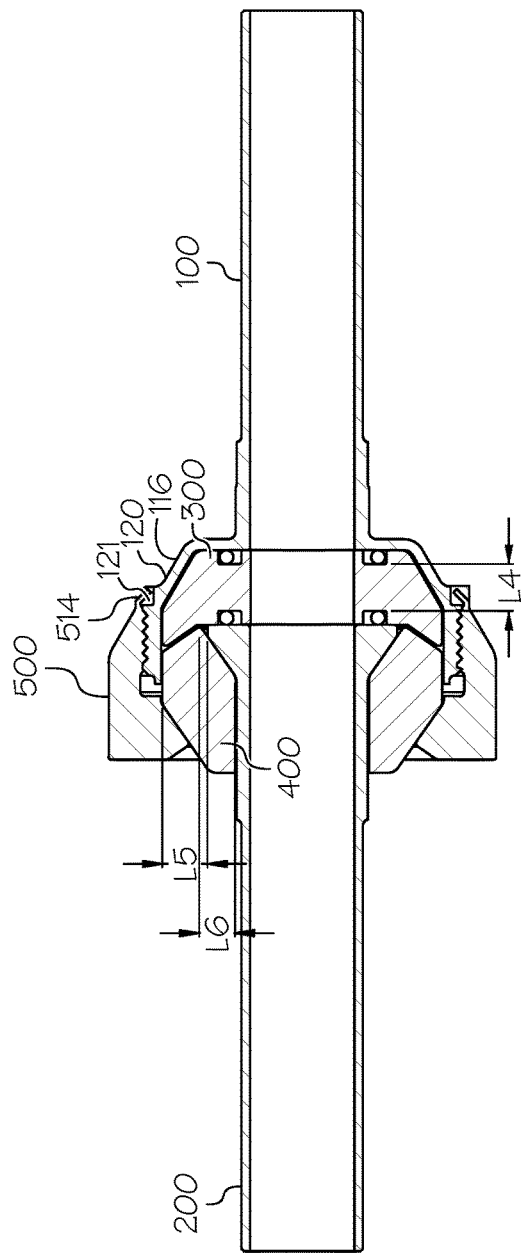

APPARATUS AND METHODS FOR CONNECTING A FIRST ELECTRICALLY CONDUCTIVE TUBE AND A SECOND ELECTRICALLY CONDUCTIVE TUBE

FIELD

The present application relates to the field of connections for connecting electrically conductive tubular components, particular connections for connecting and electrically isolating electrically conductive tubular components.

BACKGROUND

It is frequently desired to interconnect electrically conductive tubular components, such as for fluid transport systems. Fluid transport system may be used to transport fluids, such a fuel or hydraulic fluid, within platforms such an aircraft or spacecraft.

In some situations, electrostatic charge may build up on an electrically conductive tubular component. In other situations, an electromagnetic event may cause electrical current to flow in an electrically conductive tubular component. Therefore, in some situations it is desirable to electrically isolate the connected electrically conductive tubular components to protect from electrostatic charge transfer or electrical current transfer between the connected electrically conductive tubular components.

Accordingly, those skilled in the art continue with research and development in the field of connections for connecting electrically conductive tubular components.

SUMMARY

In one embodiment, an apparatus includes first and second electrically conductive tubes, first and second electrical isolators, and a nut. The first electrical isolator has a central passageway. The first electrically conductive tube has a flared end disposed around the first electrical isolator. The flared end includes external threads. The second electrically conductive tube has an outer flange. The second electrical isolator is disposed around the second electrically conductive tube and engages the outer flange. The nut is disposed around the second electrically conductive tube and engages the second electrical isolator. The nut includes internal threads corresponding to the external threads of the flared end of the first electrically conductive tube.

In another embodiment, there is a method for connecting a first electrically conductive tube and a second electrically conductive tube. The method includes inserting a first electrical isolator into a flared end of the first electrically conductive tube, the first electrical isolator having a central passageway. The method further includes positioning a second electrical isolator around the second electrically conductive tube such that the second electrical isolator engages an outer flange of the second electrically conductive tube. The method further includes positioning a nut disposed around the second electrically conductive tube and engaging the second electrical isolator. The method further includes threading the nut onto the flared end of the first electrically conductive tube.

In yet another embodiment, there is a method for connecting a first electrically conductive tube and a second electrically conductive tube. The method includes electrically isolating the first electrically conductive tube and the second electrically conductive tube by positioning at least a first electrical isolator between the first electrically conductive tube and the second electrically conductive tube, the first electrical isolator having a central passageway. The method further includes positioning a first annular sealing component between the first electrical isolator and the first electrically conductive tube. The method further includes positioning a second annular sealing component between the first electrical isolator and the second electrically conductive tube. The method further includes energizing the first annular sealing component and the second annular sealing component by axially compressing together the first electrically conductive tube and the second electrically conductive tube.

Other embodiments of the disclosed apparatus and methods for connecting a first electrically conductive tube and a second electrically conductive tube will become apparent from the following detailed description, the accompanying drawings and the appended claims.

BRIEF DESCRIPTION OF THE DRAWINGS

FIG. 2A is a left side view of the first electrically conductive tube of FIG. 1.

FIG. 2B is a right side view of the first electrically conductive tube of FIG. 2A.

FIG. 2C is a front view of the first electrically conductive tube of FIG. 2A.

FIG. 2D is a front sectional view of the first electrically conductive tube along sectional line 2-2 of FIG. 2A.

FIG. 3A is a left side view of the second electrically conductive tube of FIG. 1.

FIG. 3B is a right side view of the second electrically conductive tube of FIG. 3A.

FIG. 3C is a front view of the second electrically conductive tube of FIG. 3A.

FIG. 3D is a front sectional view of the second electrically conductive tube along sectional line 3-3 of FIG. 3A.

FIG. 6A is a left side view of the nut of FIG. 1.

FIG. 6B is a right side view of the nut of FIG. 6A.

FIG. 6C is a front view of the nut of FIG. 6A.

FIG. 6D is a front sectional view of the nut along sectional line 6-6 of FIG. 6A.

FIG. 7A is a perspective view of apparatus of FIG. 1 in a partially assembled condition.

FIG. 7B is a front sectional view of the apparatus of FIG. 7A in the partially assembled condition.

FIG. 9A is a perspective view of apparatus of FIG. 8A in a fully assembled and locked condition.

FIG. 9B is a front sectional view of the apparatus of FIG. 9A in the fully assembled and locked condition.

DETAILED DESCRIPTION

FIGS. 1-9 illustrate an exemplary apparatus 10 of the present description. It will be understood that the present description is not limited to the details as illustrated and described.

Figure 1:
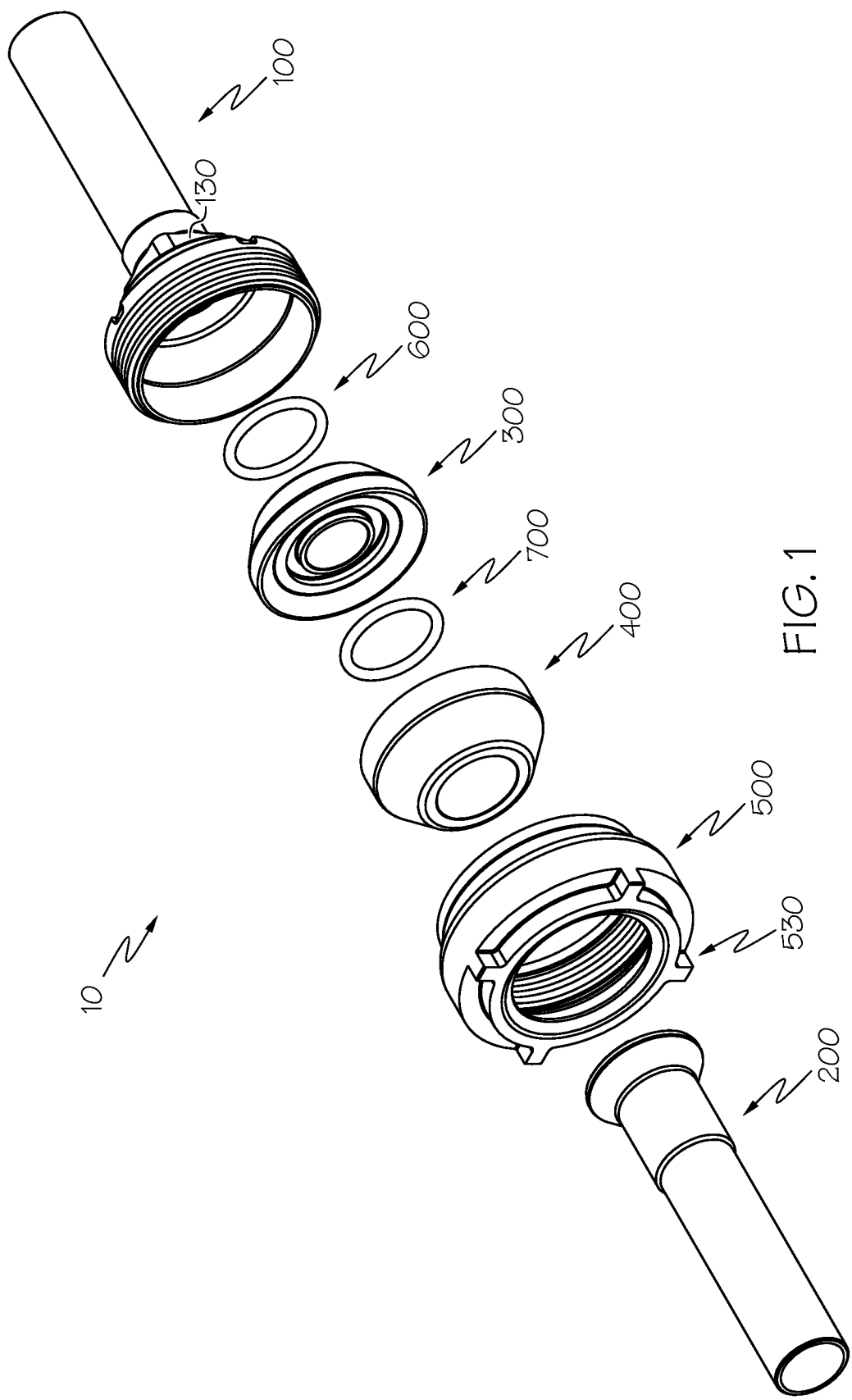
FIG. 1 is an exploded perspective view of an exemplary apparatus of the present description.

FIG. 1 illustrates an exploded perspective view of an exemplary apparatus 10 of the present description. The apparatus 10 includes a first electrically conductive tube 100, a second electrically conductive tube 200, a first electrical isolator 300, a second electrical isolator 400, and a nut 500. The apparatus 10 optionally further includes a first annular sealing component 600, a second annular sealing component 700, or both the first annular sealing component 600 and the second annular sealing component 700. The first electrically conductive tube 100, the second electrically conductive tube 200, the first electrical isolator 300, the second electrical isolator 400, the nut 500, the first annular sealing component 600 and the second annular sealing component 700 are arranged along an axis 12 having a first axial direction 14 and a second axial direction 16.

FIG. 2A illustrates a left side view of the first electrically conductive tube 100 of FIG. 1. FIG. 2B illustrates a right side view of the first electrically conductive tube 100 of FIG. 2A. FIG. 2C illustrates a front view of the first electrically conductive tube 100. FIG. 2D is a front sectional view of the first electrically conductive tube 100 along sectional line 2-2 of FIG. 2A.

The first electrically conductive tube 100, as shown, includes a first electrically conductive tube inner surface 102. The first electrically conductive tube inner surface 102 defines an inner circumference of the first electrically conductive tube 100 along axis 12.

The first electrically conductive tube 100, as shown, further includes a first electrically conductive tube outer surface 104. The first electrically conductive tube outer surface 104 defines an outer circumference of the first electrically conductive tube 100 along axis 12.

The first electrically conductive tube 100, as shown, includes a first tubular section 106 and a flared end 108.

The first tubular section 106, as shown, extends substantially uniformly along axis 12. The first tubular section 106 defines a first tubular section inner diameter D2 and a first tubular section outer diameter D4.

The flared end 108, as shown, is positioned at an end the first tubular section 106 facing the first axial direction 14. The flared end 108 has a length L2 shown in FIG. 2D as the length, with respect to axis 12, of the flared end 108 from the point of deviation from the first tubular section inner diameter D2.

The flared end 108, as shown, includes a first flared portion 110 extending radially outwardly from the first tubular section 106. The first flared portion 110 includes a first flared portion inner surface 112 facing the first axial direction 14 and a first flared portion outer surface 114 facing the second axial direction 16. The first flared portion defined a first flared portion outer diameter D5.

The flared end 108, as shown, includes a second flared portion 116 extending radially outwardly and towards the first axial direction 14. The second flared portion 116 includes a second flared portion inner surface 118 facing the first axial direction 14 and facing radially inwardly and a second flared portion outer surface 120 facing the second axial direction 16 and facing radially outwardly. The second flared portion outer surface 120, as shown, includes a secondary retention notches 121. The second flared portion 116 extends from an end of the first flared portion 110.

The flared end 108, as shown, includes a third flared portion 122 extending towards the first axial direction 14. The third flared portion 122 includes a third flared portion inner surface 124 facing radially inwardly and a third flared portion outer surface 126 facing radially outwardly. The third flared portion inner surface 124 defines a third flared portion inner diameter D6. The third flared portion outer surface 126 defines a third flared portion outer diameter D8. The third flared portion outer surface 126 includes external threads 128. The flared end 108 further includes a first torquing component 130, such as wrench flats.

The first electrically conductive tube 100 is formed from an electrically conductive material, preferably a metal or alloy, such as steel, aluminum, aluminum alloy, titanium or titanium alloy.

FIG. 3A illustrates a left side view of the second electrically conductive tube 200 of FIG. 1. FIG. 3B illustrates a right side view of the second electrically conductive tube 200 of FIG. 3A. FIG. 3C illustrates a front view of the second electrically conductive tube 200. FIG. 3D is a front sectional view of the second electrically conductive tube 200 along sectional line 3-3 of FIG. 3A.

The second electrically conductive tube 200, as shown, includes a second electrically conductive tube inner surface 202. The second electrically conductive tube inner surface 202 defines an inner circumference of the second electrically conductive tube 200 along axis 12.

The second electrically conductive tube 200, as shown, further includes a second electrically conductive tube outer surface 204. The second electrically conductive tube outer surface 204 defines an outer circumference of the second electrically conductive tube 200 along axis 12.

The second electrically conductive tube 200, as shown, includes a second tubular section 206 and an outer flange 208.

The second tubular section 206, as shown, extends substantially uniformly along axis 12. The second tubular section 206 defines a second tubular section inner diameter D10 and a second tubular section outer diameter D12. The second tubular section inner diameter D10 corresponds in size to the first tubular section inner diameter D2. The second tubular section outer diameter D12 corresponds in size to the first tubular section outer diameter D4.

The outer flange 208, as shown, is positioned at an end the second tubular section 206 facing the second axial direction 16. The outer flange 208 extends radially outwardly from the second tubular section 206. The outer flange 208 includes an outer flange side surface 210 facing the second axial direction 16. The outer flange 208 includes an outer flange outer surface 212 facing the first axial direction 14 and radially outwardly. The outer flange 208 defines an outer flange diameter D14.

The second electrically conductive tube 200 is formed from an electrically conductive material, preferably a metal or alloy, such as steel, aluminum, aluminum alloy, titanium or titanium alloy.

Figure 4A:
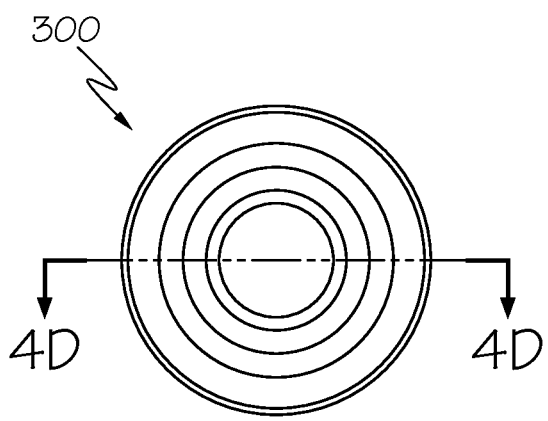
FIG. 4A is a left side view of the first electrical isolator of FIG. 1.
Figure 4B:
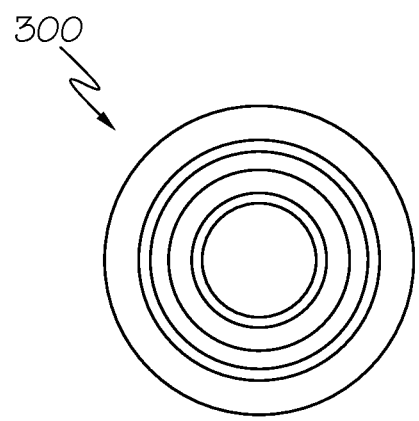
FIG. 4B is a right side view of the first electrical isolator of FIG. 4A.
Figure 4C:
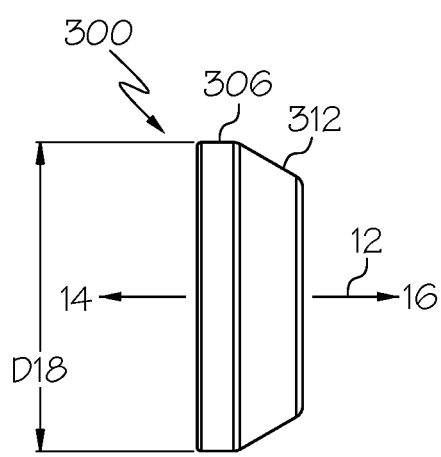
FIG. 4C is a front view of the first electrical isolator of FIG. 4A.
Figure 4D:
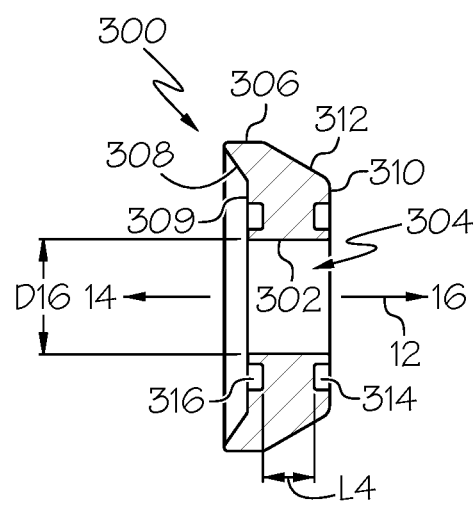
FIG. 4D is a front sectional view of the first electrical isolator along sectional line 4-4 of FIG. 4A.

FIG. 4A illustrates a left side view of the first electrical isolator 300 of FIG. 1. FIG. 4B illustrates a right side view of the first electrical isolator 300 of FIG. 4A. FIG. 4C illustrates a front view of the first electrical isolator 300. FIG. 4D is a front sectional view of the first electrical isolator 300 along sectional line 4-4 of FIG. 4A.

The first electrical isolator 300, as shown, includes a first electrical isolator inner surface 302 facing radially inwardly. The first electrical isolator inner surface 302 defines a central passageway 304 through the first electrical isolator 300. The first electrical isolator inner surface 302 defines a first electrical isolator inner diameter D16. The first electrical isolator inner diameter D16 corresponds in size to the first tubular section inner diameter D2 and the second tubular section inner diameter D10 to define an inner diameter of the apparatus 10.

The first electrical isolator 300, as shown, further includes a first electrical isolator outer surface 306 facing radially outwardly. The first electrical isolator outer surface 306 defines a first electrical isolator outer diameter D18. The first electrical isolator outer diameter D18 corresponds in size to the third flared portion inner diameter D6. The first electrical isolator outer surface 306 is configured to engage with the third flared portion inner surface 124 of the flared end 108 of the first electrically conductive tube 100.

The first electrical isolator 300, as shown, further includes a first electrical isolator outer major side surface 308 facing the first axial direction 14 and radially inwardly and a first electrical isolator inner major side surface 309 facing the first axial direction 14. The first electrical isolator inner major side surface 309, as shown, is configured to engage with the outer flange side surface 210 of the outer flange 208 of the second electrically conductive tube 200.

The first electrical isolator 300, as shown, further includes a first electrical isolator minor side surface 310 facing the second axial direction 16. The first electrical isolator minor side surface 310 is configured to engage the first flared portion inner surface 112.

The first electrical isolator 300, as shown, further includes a first electrical isolator inclined surface 312 facing the second axial direction 16 and radially outwardly. The first electrical isolator inclined surface 312 is configured to engage the second flared portion inner surface 118.

The first electrical isolator 300, as shown, further includes a first annular groove 314 disposed in the first electrical isolator minor side surface 310 around the central passageway 304.

The first electrical isolator 300, as shown, further includes a second annular groove 316 disposed in the first electrical isolator inner major side surface 309 around the central passageway 304.

The first electrical isolator 300, as shown, has a minimum length represented by L4 shown as the distance between the first annular groove 314 and the second annular groove 316.

Figure 5A:
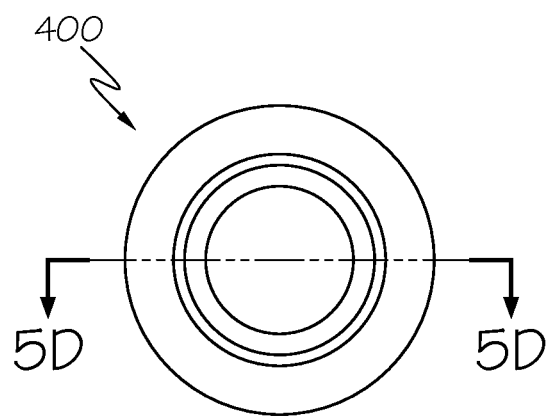
FIG. 5A is a left side view of the second electrical isolator of FIG. 1.
Figure 5B:
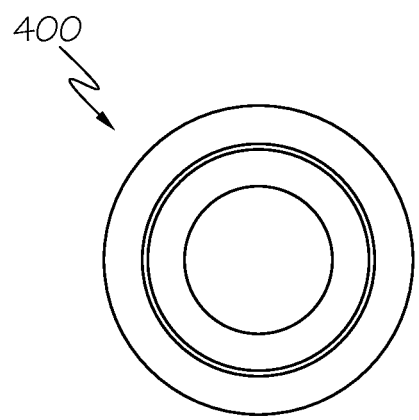
FIG. 5B is a right side view of the second electrical isolator of FIG. 5A.
Figure 5C:
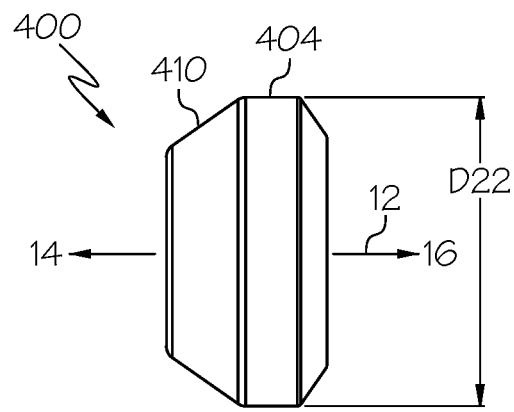
FIG. 5C is a front view of the second electrical isolator of FIG. 5A.
Figure 5D:
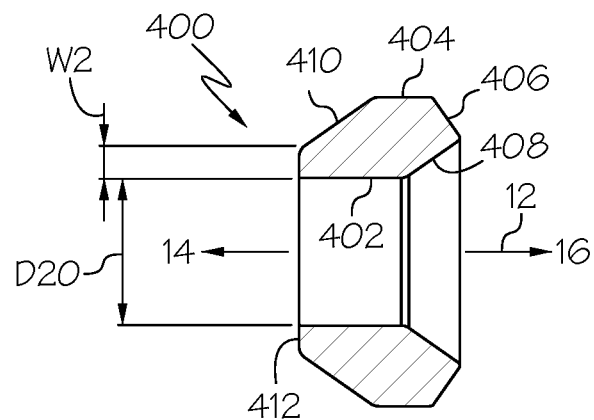
FIG. 5D is a front sectional view of the second electrical isolator along sectional line 5-5 of FIG. 5A.

FIG. 5A illustrates a left side view of the second electrical isolator 400 of FIG. 1. FIG. 5B illustrates a right side view of the second electrical isolator 400 of FIG. 5A. FIG. 5C illustrates a front view of the second electrical isolator 400. FIG. 5D is a front sectional view of the second electrical isolator 400 along sectional line 5-5 of FIG. 5A.

The second electrical isolator 400, as shown, includes a second electrical isolator inner surface 402 facing radially inwardly and defining a second electrical isolator inner diameter D20. The second electrical isolator inner diameter D20 corresponds in size to the second tubular section outer diameter D12 of the second tubular section 206 of the second electrically conductive tube 200. The second electrical isolator inner surface 402 is configured to engage with the second electrically conductive tube outer surface 204 of the second tubular section 206 of the second electrically conductive tube 200.

The second electrical isolator 400, as shown, further includes a second electrical isolator outer surface 404 facing radially outwardly and defining a second electrical isolator outer diameter D22. The second electrical isolator outer diameter D22 corresponds in size to the first electrical isolator outer diameter D18 and the third flared portion inner diameter D6. The second electrical isolator outer surface 404 is configured to engage the third flared portion inner surface 124.

The second electrical isolator 400, as shown, further includes a second electrical isolator outer major side surface 406 facing the second axial direction 16 and radially outwardly. The second electrical isolator outer major side surface 406 is configured to engage the first electrical isolator outer major side surface 308.

The second electrical isolator 400, as shown, further includes a second electrical isolator inner major side surface 408 facing the second axial direction 16 and radially inwardly and a second electrical isolator outer minor side surface 410 facing the first axial direction 14 and radially outwardly. The second electrical isolator inner major side surface 408 is configured to engage the outer flange outer surface 212 of the outer flange 208 of the second electrically conductive tube 200.

The second electrical isolator 400, as shown, further includes a second electrical isolator inner minor side surface 412 facing the first axial direction 14. The second electrical isolator 400 has a minimum width W2 represented by the width of the second electrical isolator inner minor side surface 412.

FIG. 6A illustrates a left side view of the nut 500 of FIG. 1. FIG. 6B illustrates a right side view of the nut 500 of FIG. 6A. FIG. 6C illustrates a front view of the nut 500. FIG. 6D is a front sectional view of the nut 500 along sectional line 6-6 of FIG. 6A.

The nut 500, as shown, includes a nut inner surface 502, a nut outer surface 504, a nut front side 506, and a nut rear side 508.

The nut 500, as shown, further includes internal threads 510. The internal threads 510 define a nut internal diameter D24. The nut internal diameter D24 corresponds to the third flared portion outer diameter D8 of the flared end 108 of the first electrically conductive tube 100.

The nut 500, as shown, further includes a nut inclined surface 512. The nut inclined surface 512 is configured to engage with the second electrical isolator outer minor side surface 410.

The nut 500, as shown, further includes a secondary retention feature in the form of a deformable rim 514. The deformable rim 514 is configured to deform into engagement with the secondary retention notches 121 of the second flared portion outer surface 120.

The nut 500, as shown, further includes a second torquing component 530, such as wrench flats. The first torquing component 130 and the second torquing component 530 are configured to facilitate threading of the internal threads 510 of the nut 500 with the external threads 128 of the first electrically conductive tube 100.

Returning to FIG. 1, the first annular sealing component 600 is illustrated as O-ring that can be inserted into the first annular groove 314, and the second annular sealing component 700 is illustrated as O-ring that can be inserted into the second annular groove 316. However, the first annular sealing component 600 and the second annular sealing component 700 are not limited to an O-ring. In an example, the first annular groove 314 could be formed in the first electrically conductive tube 100, the second annular groove 316 could be formed in the second electrically conductive tube 200, or both the first annular groove 314 and the second annular groove 316 could be formed in the first electrically conductive tube 100 and second electrically conductive tube 200, respectively. In another aspect, a liquid sealing material could be injected into the first annular groove 314, the second annular groove 316, or both the first annular groove 314 and the second annular groove 316. Additional arrangements and formulations of the annular sealing components could be applied.

In an aspect, the first electrical isolator 300 and the second electrical isolator 400 are formed from an electrical isolator material having an electrical resistance sufficiently high to reduce the flow of electrical current or transfer of electrostatic discharge between the first electrically conductive tube 100, the second electrically conductive tube 200, and the nut 500. In an example, the electrical isolator material may be a dielectric material. In another example, the electrical isolator material may be a semiconductor material. The electrical isolator material may or may not be capable of dissipating electrostatic charge.

FIG. 7A is a perspective view of apparatus 10 of FIG. 1 in a partially assembled condition. As shown, the apparatus 10 in the partially assembled condition includes a first assembly of the first electrically conductive tube 100 and the first electrical isolator 300 and a second assembly of the second electrically conductive tube 200, the second electrical isolator 400, and the nut 500. FIG. 7B is a front sectional view of the apparatus 10 of FIG. 7A in the partially assembled condition.

In the first assembly, the flared end 108 of the first electrically conductive tube 100 is disposed around the first electrical isolator 300. As shown, the first electrical isolator minor side surface 310 can be engaged with the first flared portion inner surface 112. As shown, the first electrical isolator inclined surface 312 can be engaged with the second flared portion inner surface 118. As shown, the first electrical isolator outer surface 306 can be engaged with the third flared portion inner surface 124. The first electrical isolator inner diameter D16 corresponds in size to the first tubular section inner diameter D2.

In the first assembly, the first annular sealing component 600 can be disposed in the first annular groove 314 of the first electrical isolator 300, and the second annular sealing component 700 is disposed in the second annular groove 316 of the first electrical isolator 300.

The first annular sealing component 600 seals between the first electrical isolator 300 and the flared end 108 of the first electrically conductive tube 100. As shown, the first annular sealing component 600 can be engaged with the first flared portion inner surface 112.

In the second assembly, the second electrical isolator 400 is disposed around the second electrically conductive tube 200 and engaging the outer flange 208. As shown, the second electrical isolator inner surface 402 can be engaged with the second electrically conductive tube outer surface 204. As shown, the second electrical isolator inner major side surface 408 can be engaged with the outer flange outer surface 212. The second electrical isolator inner diameter D20 corresponds in size to the second tubular section outer diameter D12 of the second tubular section 206 of the second electrically conductive tube 200. The nut 500 is disposed around the second electrically conductive tube 200.

Figure 8A:
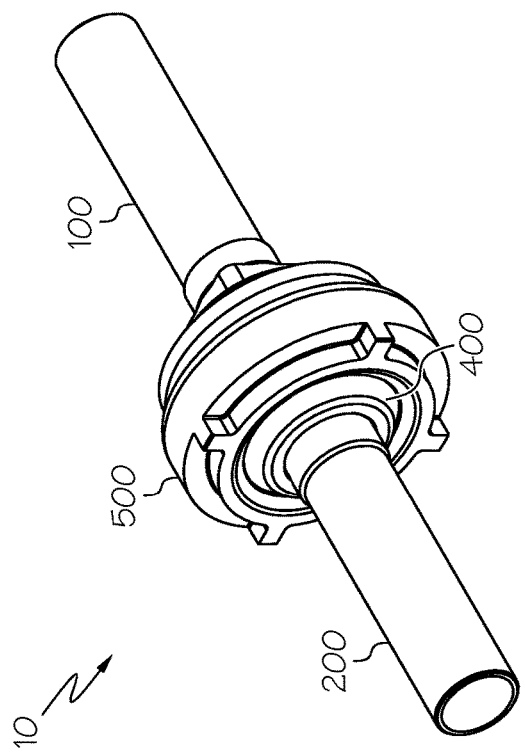
FIG. 8A is a perspective view of apparatus of FIG. 7A in a fully assembled condition.
Figure 8B:
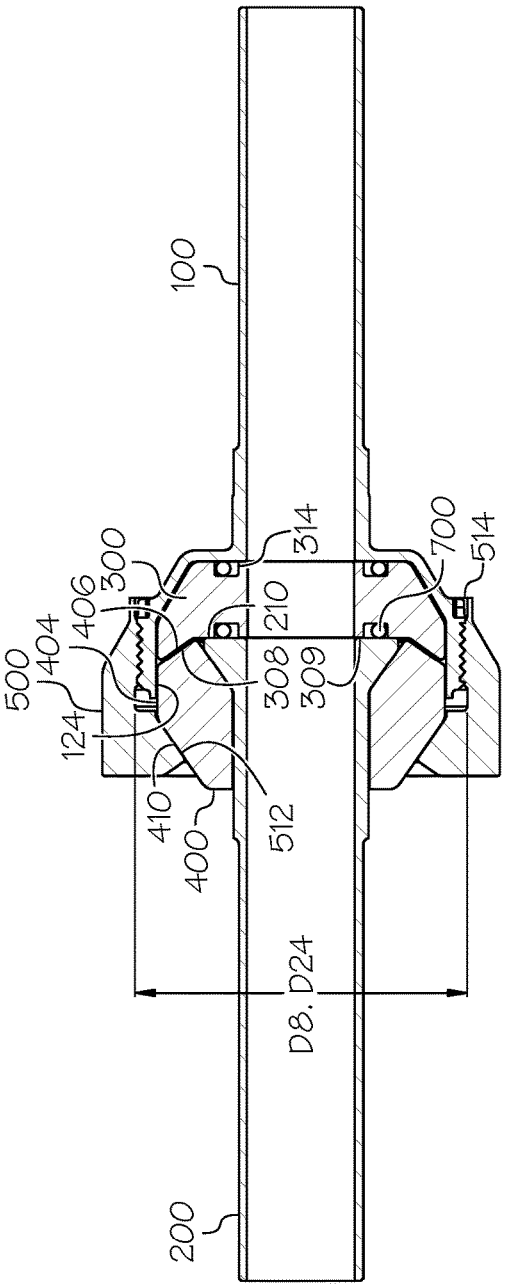
FIG. 8B is a front sectional view of the apparatus of FIG. 8A in the fully assembled condition.

FIG. 8A is a perspective view of apparatus 10 of FIG. 7A in a fully assembled condition. As shown, the apparatus 10 in the fully assembled condition includes the first electrically conductive tube 100, the second electrically conductive tube 200, the first electrical isolator 300, the second electrical isolator 400, and the nut 500. FIG. 8B is a front sectional view of the apparatus 10 of FIG. 8A in the fully assembled condition.

As shown, the first assembly of the first electrically conductive tube 100 and the first electrical isolator 300 is engaged with the second assembly of the second electrically conductive tube 200 and the second electrical isolator 400. The outer flange side surface 210 can be engaged with the first electrical isolator inner major side surface 309. The first electrical isolator outer major side surface 308 can be engaged with the second electrical isolator outer major side surface 406. The third flared portion inner surface 124 can be engaged with the second electrical isolator outer surface 404. The first electrical isolator inner diameter D16 corresponds in size to the first tubular section inner diameter D2 and the second tubular section inner diameter D10 to define an inner diameter of the apparatus 10.

As shown, the second annular sealing component 700 seals between the first electrical isolator 300 and the outer flange 208 of the second electrically conductive tube 200. As shown, the second annular sealing component 700 can be engaged with the first electrical isolator inner major side surface 309.

As shown, the nut 500 is disposed around the second electrically conductive tube 200 and engages the second electrical isolator 400. The nut inclined surface 512 can be engaged with the second electrical isolator inner minor side surface.

The internal threads 510 of the nut 500 engage with the external threads 128 of the flared end 108 of the first electrically conductive tube 100. By threading the internal threads 510 with the external threads 128, the first assembly of the first assembly of the first electrically conductive tube 100 and the first electrical isolator 300 is compressed with the second assembly of the second electrically conductive tube 200 and the second electrical isolator 400. Thus, the first annular sealing component 600 and the second annular sealing component 700 can be energized by the compressing together of first assembly and the second assembly.

As shown in FIGS. 8A and 8B, deformable rim 514 is in the undeformed condition. Therefore, the apparatus is in an unlocked condition.

FIG. 9A is a perspective view of apparatus 10 of FIG. 8A in a fully assembled and locked condition. As shown, the apparatus 10 in the fully assembled and locked condition includes the first electrically conductive tube 100, the second electrically conductive tube 200, the first electrical isolator 300, the second electrical isolator 400, and the nut 500. FIG. 9B is a front sectional view of the apparatus 10 of FIG. 9A in the fully assembled and locked condition.

As shown, the first assembly of the first electrically conductive tube 100 and the first electrical isolator 300 is compressed against the second assembly of the second electrically conductive tube 200 and the second electrical isolator 400 by the threading the internal threads 510 of the nut 500 with the external threads 128 of the first conductive tube 100.

As further shown, deformable rim 514 is deformed into engagement with the flared end 108 of the first electrically conductive tube 100. The deformable rim 514 can be deformed into engagement with second flared portion 116. By deforming the deformable rim 514, unthreading of the internal threads 510 of the nut 500 from the external threads 128 of the first conductive tube 100 can be prevented, thereby locking the apparatus 10 in the fully assembled and locked condition.

In an aspect, each of the electrically conductive components of the apparatus, such as the first electrically conductive tube 100, the second electrically conductive tube 200, and the nut 500 are separated by a minimum length of isolator material, such as the first electrical isolator 300 and the second electrical isolator 400, depending on the resistance of the isolator material and depending on the application. As shown, the first flared portion 110 is separated from the outer flange 208 by a minimum length L4 of the first electrical isolator 300. As shown, the third flared portion 122 is separated from the outer flange 208 by a minimum length L5 of the combination of the first electrical isolator 300 and the second electrical isolator 400. As shown, the nut 500 is separated from the second tubular section 206 by a minimum length L6 of the second electrical isolator 400. In an example, the minimum length of isolator material may be at least 0.1 inch. In another example, the minimum length of isolator material may be at least 0.2 inch. In yet another example, the minimum length of isolator material may be at least 0.4 inch. The minimum length may be sufficient such that no sparking occurs between each of the electrically conductive components of the apparatus.

In an aspect, the apparatus is disposed within one of an aerial platform, a space platform, and an aerospace platform. The aerial platform may be, for example, an aircraft, an unmanned aerial vehicle, a helicopter, or some other type of aerial vehicle or platform. The space platform may be, for example, a spacecraft, a space shuttle, a satellite station, a space station, or some other type of space vehicle or platform. The aerospace platform may be, for example, a space shuttle, a two-stage hypersonic vehicle, or some other type of vehicle capable of traveling through both air and space. However, the apparatus is not limited to the above applications and may be used in any application where electrical isolation of electrically conductive components is desired.

Figure 10:
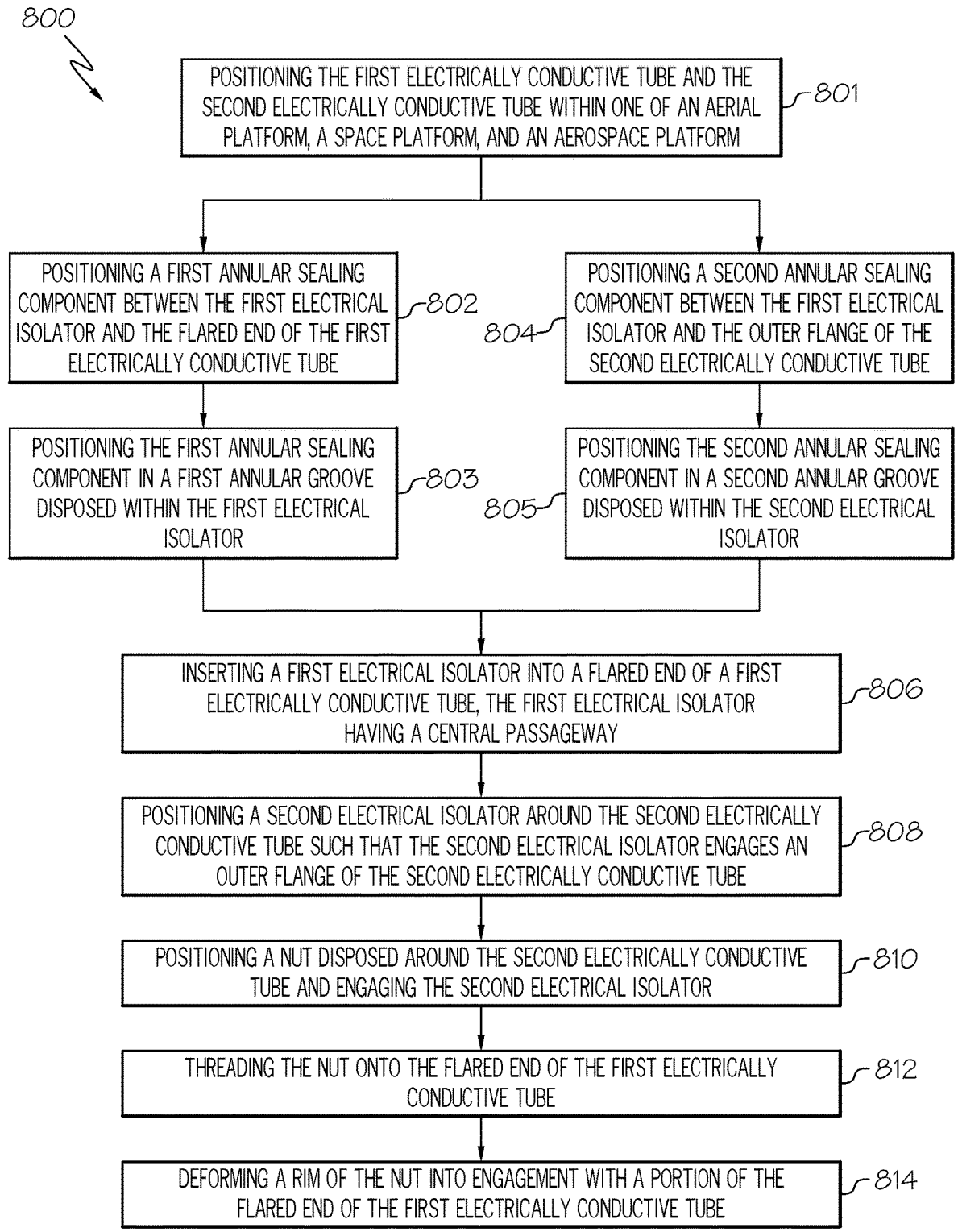
FIG. 10 is a flow diagram of a method for connecting electrically conductive tubular components.

FIG. 10 is a flow diagram of a method 800 for connecting the first electrically conductive tube 100 and the second electrically conductive tube 200. As shown, the method 800 includes, at block 806, inserting a first electrical isolator 300 into a flared end 108 of the first electrically conductive tube 100, the first electrical isolator 300 having a central passageway 304. The method 800 further includes, at block 808, positioning a second electrical isolator 400 around the second electrically conductive tube 200 such that the second electrical isolator 400 engages an outer flange 208 of the second electrically conductive tube 200. The method 800 further includes, at block 810, positioning a nut 500 disposed around the second electrically conductive tube 200 and engaging the second electrical isolator 400. The method 800 further includes, at block 812, threading the nut 500 onto the flared end 108 of the first electrically conductive tube 100.

The method 800 may further include, at block 802, positioning a first annular sealing component 600 between the first electrical isolator 300 and the flared end 108 of the first electrically conductive tube 100. The step, at block 802, of positioning the first annular sealing component 600 between the first electrical isolator 300 and the flared end 108 of the first electrically conductive tube 100 may further include, at block 803, positioning the first annular sealing component 600 in a first annular groove 314 disposed within the first electrical isolator 300.

The method 800 may further include, at block 804, positioning a second annular sealing component 700 between the first electrical isolator 300 and the outer flange 208 of the second electrically conductive tube 200. The step, at block 804, of positioning the second annular sealing component 700 between the first electrical isolator 300 and the outer flange 208 of the second electrically conductive tube 200 may further include, at block 805, positioning the second annular sealing component 700 in a second annular groove 316 disposed within the first electrical isolator 300.

The method 800 may further include, at block 814, deforming a rim 514 of the nut 500 into engagement with the flared end 108 of the first electrically conductive tube 100.

The method 800 may further include, at block 801, positioning the first electrically conductive tube 100 and the second electrically conductive tube 200 within one of an aerial platform, a space platform, and an aerospace platform.

Figure 11:
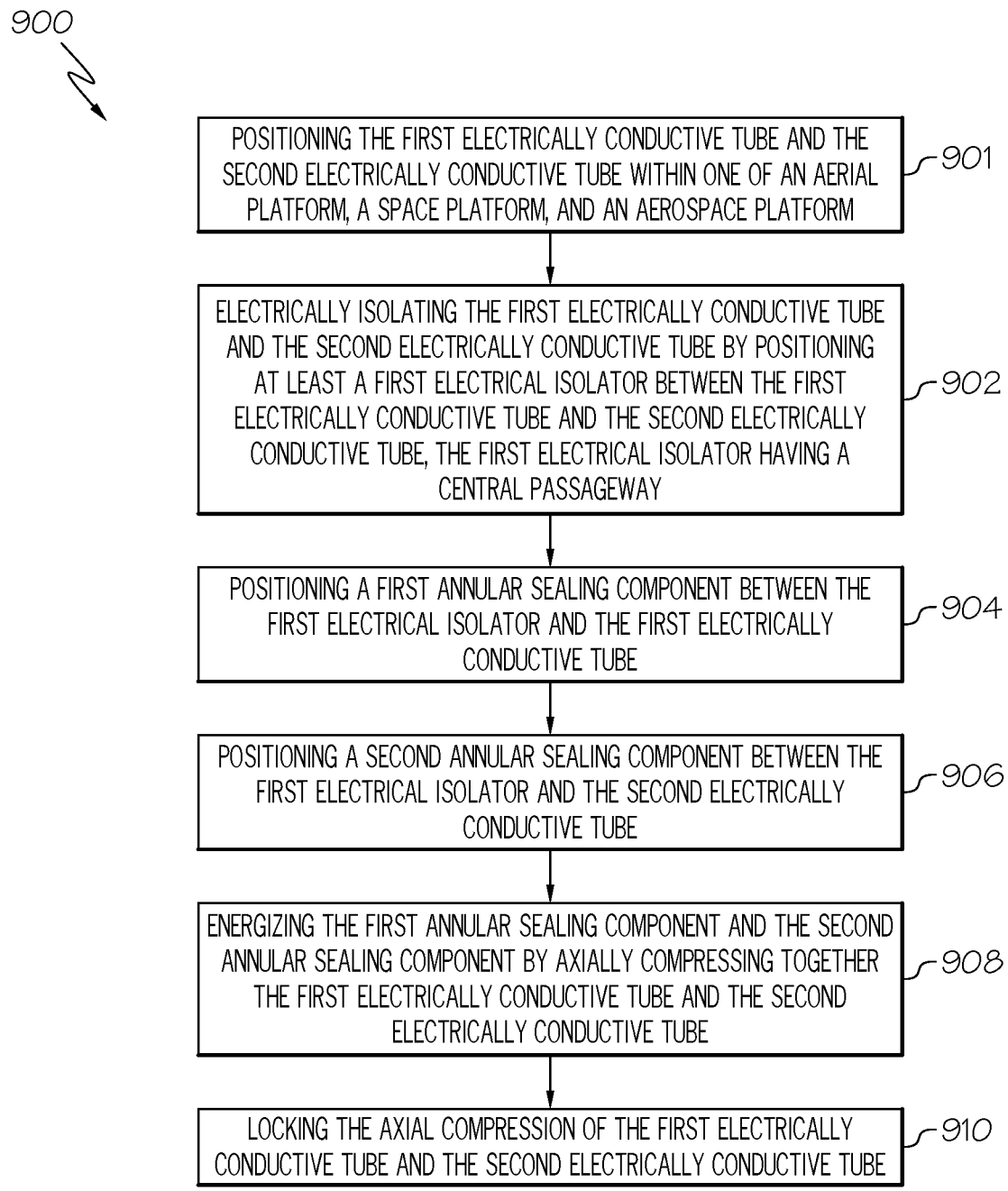
FIG. 11 is a flow diagram of another method for connecting electrically conductive tubular components.

FIG. 11 is a flow diagram of a method 900 for connecting the first electrically conductive tube 100 and the second electrically conductive tube 200.

As shown, the method 900 includes, at block 902, electrically isolating the first electrically conductive tube 100 and the second electrically conductive tube 200 by positioning at least a first electrical isolator 300 between the first electrically conductive tube 100 and the second electrically conductive tube 200, the first electrical isolator 300 having a central passageway 304. The method 900 further includes, at block 904, positioning a first annular sealing component 600 between the first electrical isolator 300 and the first electrically conductive tube 100. The method 900 further includes, at block 906, positioning a second annular sealing component 700 between the first electrical isolator 300 and the second electrically conductive tube 200. The method 900 further includes, at block 908, energizing the first annular sealing component 600 and the second annular sealing component 700 by axially compressing together the first electrically conductive tube 100 and the second electrically conductive tube 200. The energizing of the first annular sealing component 600 and the second annular sealing component 700 by axially compressing together the first electrically conductive tube 100 and the second electrically conductive tube 200 may include but is not limited to use of nut 500 as previously described. However, other methods of axially compressing together the first electrically conductive tube 100 and the second electrically conductive tube 200 may be employed. In an aspect, the first annular sealing component 600 and the second annular sealing component 700 can be used to prevent fluid inside the first electrically conductive tube 100 and the second electrically conductive tube 200 from escaping under pressure.

The method 900 may further include, at block 910, locking the axial compression of the first electrically conductive tube 100 and the second electrically conductive tube 200. The locking of the axial compression of the first electrically conductive tube 100 and the second electrically conductive tube 200 may include but is not limited to use of the deformable rim 514 as previously described. However, other methods of locking of the axial compression of the first electrically conductive tube 100 and the second electrically conductive tube 200 may be employed.

The method 900 may further include, at block 901, positioning the first electrically conductive tube 100 and the second electrically conductive tube 200 within one of an aerial platform, a space platform, and an aerospace platform.

Figure 12:
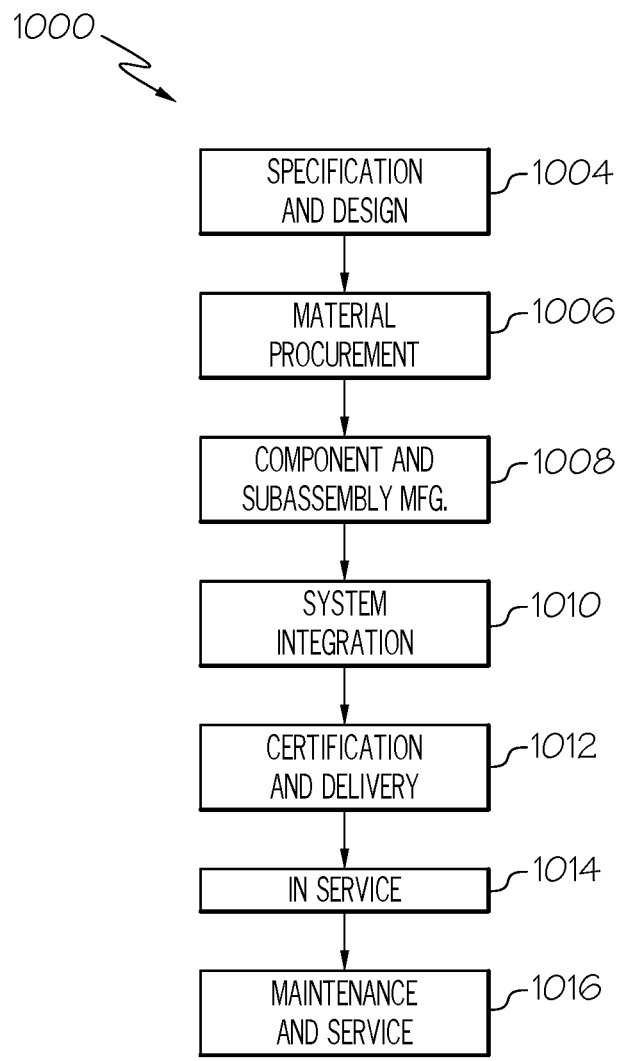
FIG. 12 is a flow diagram of an aircraft manufacturing and service methodology.
Figure 13:
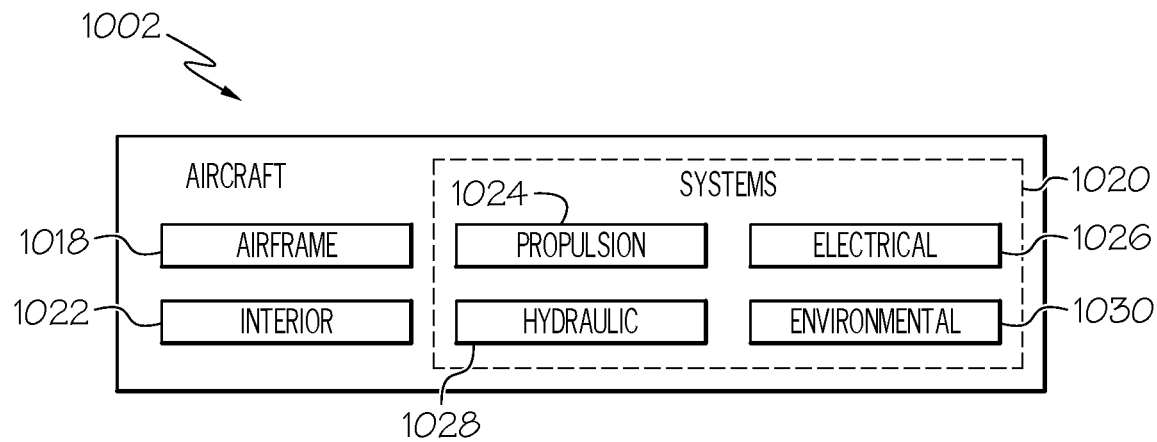
FIG. 13 is a block diagram of an aircraft.

Examples of the present disclosure may be described in the context of an aircraft manufacturing and service method 1000, as shown in FIG. 12 and an aircraft 1002, as shown in FIG. 13. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The apparatus and methods for connecting a first electrically conductive tube and a second electrically conductive tube of the present disclosure may be employed during any one or more of the stages of the aircraft manufacturing and service method 1000, including specification and design 1004 of the aircraft 1002, material procurement 1006, component/subassembly manufacturing 1008, system integration 1010, certification and delivery 1012, placing the aircraft in service 1014, and routine maintenance and service 1016.

As shown in FIG. 13, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included. The apparatus and methods for connecting a first electrically conductive tube and a second electrically conductive tube of the present disclosure may be employed for any of the systems of the aircraft 1002.

Although various embodiments of the disclosed apparatus and methods for connecting a first electrically conductive tube and a second electrically conductive tube have been shown and described, modifications may occur to those skilled in the art upon reading the specification. The present application includes such modifications and is limited only by the scope of the claims.

What is claimed is:

1. An apparatus comprising:
    a first electrical isolator having a central passageway;
    a first electrically conductive tube having a flared end disposed around the first electrical isolator, the flared end comprising external threads;
    a second electrically conductive tube having an outer flange;
    a second electrical isolator disposed around the second electrically conductive tube and engaging the outer flange; and
    a nut disposed around the second electrically conductive tube and engaging the second electrical isolator, the nut comprising internal threads corresponding to the external threads of the flared end of the first electrically conductive tube,
    wherein the nut comprises a deformable rim adjacent to a secondary retention notch of the flared end of the second electrically conductive tube and configured to deform into engagement with the secondary retention notch.

2. The apparatus of claim 1 further comprising a first annular sealing component sealing between the first electrical isolator and the flared end of the first electrically conductive tube.

3. The apparatus of claim 2 wherein the first electrical isolator has a first annular groove disposed around the central passageway, and wherein the first annular sealing component is disposed in the first annular groove.

4. The apparatus of claim 3 wherein first annular sealing component is a first O-ring.

5. The apparatus of claim 1 further comprising a first annular sealing component sealing between the first electrical isolator and the outer flange of the second electrically conductive tube.

6. The apparatus of claim 5 wherein the first electrical isolator has a first annular groove disposed around the central passageway, and wherein the first annular sealing component is disposed in the first annular groove.

7. The apparatus of claim 6 wherein first annular sealing component is a first O-ring.

8. The apparatus of claim 1 wherein the nut comprises an electrically conductive material.

9. The apparatus of claim 1 wherein the apparatus is disposed within one of an aerial platform, a space platform, and an aerospace platform.

10. A method for connecting a first electrically conductive tube and a second electrically conductive tube, the method comprising:
    inserting a first electrical isolator into a flared end of the first electrically conductive tube, the first electrical isolator having a central passageway;
    positioning a second electrical isolator around the second electrically conductive tube such that the second electrical isolator engages an outer flange of the second electrically conductive tube;
    positioning a first annular sealing component between the first electrical isolator and the flared end of the first electrically conductive tube;
    positioning a nut disposed around the second electrically conductive tube and engaging the second electrical isolator; and
    threading the nut onto the flared end of the first electrically conductive tube,
    wherein the second electrical isolator engages the first electrical isolator.

11. The method of claim 10 wherein positioning the first annular sealing component between the first electrical isolator and the flared end of the first electrically conductive tube comprises positioning the first annular sealing component in a first annular groove disposed within the first electrical isolator.

12. The method of claim 10 further comprising positioning a first annular sealing component between the first electrical isolator and the outer flange of the second electrically conductive tube.

13. The method of claim 12 wherein positioning the first annular sealing component between the first electrical isolator and the outer flange of the second electrically conductive tube comprises positioning the first annular sealing component in a first annular groove disposed within the second electrical isolator.

14. The method of claim 10 further comprising deforming a rim of the nut into engagement with a portion of the flared end of the first electrically conductive tube.

15. The method of claim 10 further comprising positioning the first electrically conductive tube and the second electrically conductive tube within one of an aerial platform, a space platform, and an aerospace platform.

16. An apparatus comprising:
a first electrical isolator having a central passageway;
a first electrically conductive tube having a flared end disposed around the first electrical isolator, the flared end comprising external threads;
a second electrically conductive tube having an outer flange;
a second electrical isolator disposed around the second electrically conductive tube and engaging the outer flange;
a first annular sealing component sealing between the first electrical isolator and the flared end of the first electrically conductive tube, wherein the first electrical isolator has a first annular groove disposed around the central passageway, and wherein the first annular sealing component is disposed in the first annular groove;
a second annular sealing component sealing between the first electrical isolator and the outer flange of the second electrically conductive tube; and
a nut disposed around the second electrically conductive tube and engaging the second electrical isolator, the nut comprising internal threads corresponding to the external threads of the flared end of the first electrically conductive tube.

17. The apparatus of claim 16 wherein the first electrical isolator has a second annular groove disposed around the central passageway, and wherein the second annular sealing component is disposed in the second annular groove.

18. The apparatus of claim 16 wherein the apparatus is disposed within an aerial platform.

19. The apparatus of claim 16 wherein the apparatus is disposed within a space platform.

20. The apparatus of claim 16 wherein the apparatus is disposed within an aerospace platform.

* * * * *